Oct. 5, 1954
O. H. SCHUCK
2,691,123
SENSITIVITY CONTROL FOR FOLLOW-UP
TYPE OF COMPUTER APPARATUS
Filed Jan. 21, 1950
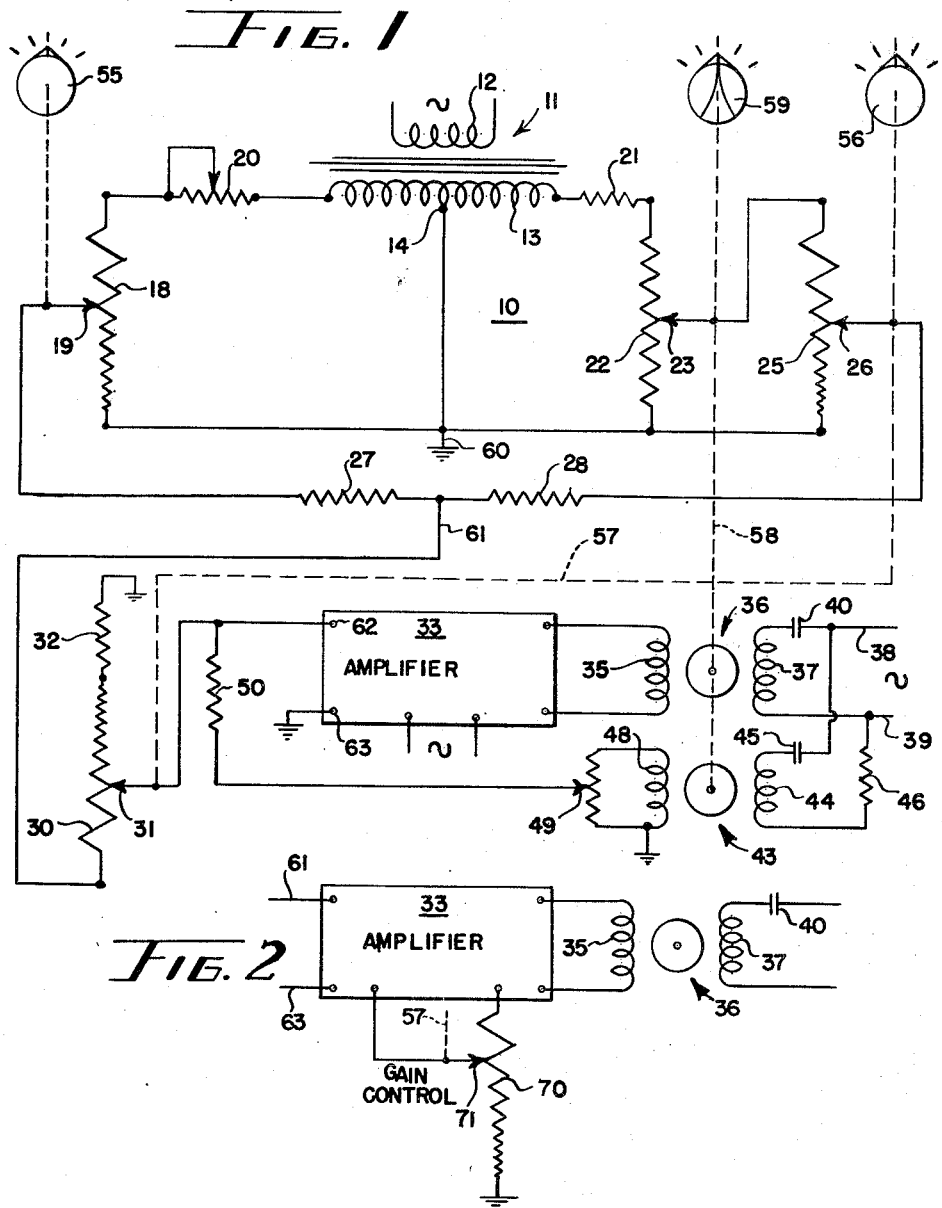
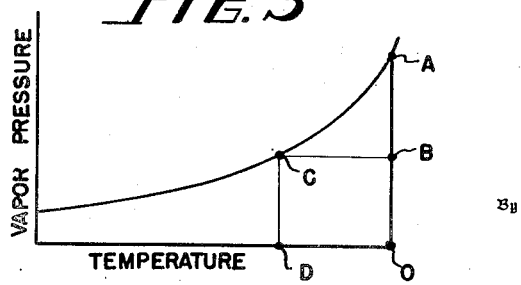
Inventor
OSCAR HUGO SCHUCK
George H Fisher
Attorney Patented Oct. 5, 1954

2,691,123

UNITED STATES PATENT OFFICE 2,691,123

SENSITIVITY CONTROL FOR FOLLOW-UP TYPE OF COMPUTER APPARATUS

Oscar Hugo Schuck, Minneapolis, Minn., assignor to Minneapolis-Honeywell Regulator Company, Minneapolis, Minn., a corporation of Delaware Application January 21, 1950, Serial No. 139,857

14 Claims. (Cl. 318—28)

The present invention is concerned with improvements in electrical computer circuits. More particularly the invention is concerned with a sensitivity adjustment for maintaining effectively constant the ratio between a signal voltage and the amount of adjustment of impedances in an electrical computer circuit which may be computing, for example, relative humidity.

In present day electrical control systems, especially in those systems wherein motor control is to be accomplished by variations in a plurality of interconnected impedances in a control network, a problem of maintaining a constant sensitivity often arises when certain of the impedances are adjusted from one extreme position to another. When no provision is made for compensating for changes resulting from adjustment of certain of the impedances, motors which may be controlled by the control system may act sluggishly in one range of adjustment of certain of the impedances and respond so fast in other ranges of adjustment that there may be hunting and the system may be unstable. These undesirable characteristics are eliminated in the present invention by providing a special circuit arrangement including an adjustable impedance which tends to make the system more sensitive in that range where there is a tendency for sluggishness and less sensitive in that range where the system tends to be unstable.

It is therefore an object of the present invention to provide an electrical motor control apparatus wherein the controlled motor responds in substantially the same manner regardless of the adjustment of the apparatus.

Another object of the present invention is to provide an electrical computer apparatus and a control means whose sensitivity is varied whenever a certain function affecting the apparatus is changed.

Still another object of the present invention is to provide in an electrical control system, wherein a plurality of impedances are adjusted and the ratio of output control signal per unit of adjustment varies, an impedance for maintaining the effective ratio of adjustment to output signal constant over all ranges of adjustment of said impedance.

A further object of the present invention is to provide for use with a mathematical product determining apparatus a sensitivity adjustment for maintaining constant the ratio between a control signal and the unit of adjustment of a portion of said apparatus over all ranges of adjustment thereof.

A still further object of the present invention is to provide a new and improved relative humidity computing apparatus whose operation is stable throughout its range of computation.

These and other objects of the present invention will become apparent upon a consideration of the following specification, claims and appended drawings of which:

Figure 1 is a schematic showing of a relative humidity computer which embodies the present invention.

Figure 2 is a modified portion of Figure 1; and

Figure 3 shows a section of a psychometric chart.

Referring now to Figure 1, there is provided an electrical computer circuit 10 which comprises a source of power 11 in the form of a transformer having a primary 12 and a secondary 13, the latter of which is center-tapped at 14. Connected to the left hand terminal and tap 14 of secondary 13 is a potentiometer resistor 18 having a nonlinear characterization and having a tap or slider 19 which is movable thereon. In series with this potentiometer resistor is a calibration rheostat 20 whose mean value is equal to that of series resistor 21. Connected to the right hand terminal and tap 14 of secondary 13 through series resistor 21, is a potentiometer resistor 22 having a tap or slider 23. Connected between the tap 23 and one end of resistor 22 is a further potentiometer resistor 25 having a nonlinear characterization and a tap or slider 26.

The taps 26 and 19 form the output terminals of the computer circuit 10 and the signals thereon are applied through a pair of resistors 27 and 28 through a further nonlinear potentiometer resistor 30 having a tap or slider 31. A resistor 32 is connected in series with the potentiometer resistor 30.

Connected to the tap 31 of resistor 30 is an amplifier 33 which may be of the type disclosed in the Albert P. Upton Patent 2,423,534. The output of the amplifier is connected in energizing relation to one winding 35 of a two phase reversible motor 36. This motor 36 has a line phase winding 37 which is continuously energized by the power on the lines 38 and 39 and the power is fed from these lines through a phase shifting capacitor 40 to the winding 37. The motor 36 will run in one direction or the other depending on the alternating current phasing of winding 35 with respect to winding 37, as described in the aforementioned Upton patent.

A velocity generator 43 is driven by the motor 36 and aids in the stabilizing of the motor operation. This velocity generator has a field winding 44 energized, through a capacitor 45 and a voltage dropping resistor 46, by the power on lines 38 and 39. A pickup winding 48 is used to feed an anti-hunting signal into the amplifier 33 through a potentiometer 49 and a resistor 50.

Adjusting knobs 55 and 56 are used to position the sliders 19 and 26, respectively. The knob 56 is also used to position the slider 31 at the same time that the slider 26 is being positioned and is connected thereto by a mechanical connection indicated by the numeral 57. The motor 36 positions the slider 23 along resistor 22 by means of a mechanical connection 58 and also positions an indicator 59 which, with a properly calibrated scale, indicates the result of the computation of the above described apparatus.

*Operation*

In discussing the operation of the apparatus, the problem of determining relative humidity will first be considered. Relative humidity has been defined as the ratio of the existing partial water vapor pressure at a dry bulb temperature to the saturated vapor pressure of water at the same dry bulb temperature. It is also known that the partial vapor pressure of water at a certain dry bulb temperature will be equal to the saturated water vapor pressure at the corresponding dew point temperature of the mixture. Thus, referring to Figure 3, which is a curve which indicates saturated water vapor pressure at various dry bulb temperatures, it will be seen that relative humidity for one particular set of conditions may be determined. For example, at a dry bulb temperature O the saturated water vapor pressure will be OA. Assuming that under the same conditions the dew point temperature is D, the saturated water vapor pressure for a dew point temperature of D will be DC. Since it is known that the saturated water vapor pressure at the dew point equals the partial water vapor pressure at dry bulb temperature it is possible to set up the relationship that relative humidity equals the ratio of OB to OA where OB equals DC. In other words, the relative humidity in terms of a percentage times the saturated water vapor pressure at dry bulb temperature O will equal the saturated water vapor pressure at the dew point temperature D or the partial water vapor pressure at the dry bulb temperature O.

Using the foregoing, a computer has been built to solve electro-mechanically the mathematical problem. To determine relative humidity, a first adjustment must be made in the circuits in accordance with the dew point temperature and this is done by the manual or automatic setting of the knob 55. This knob in turn operates upon the slider 19 to position the same upon the potentiometer resistor 18. As mentioned above, this potentiometer has a nonlinear characteristic which, for this example, is the configuration of the saturation curve of Figure 3. With such a characteristic in potentiometer resistor 18 and with the potentiometer resistor connected as it is to the secondary 13 between the tap 14 and the left hand end of the secondary, adjustment of the slider 19 in accordance with the dew point temperature will result in an electrical signal appearing between the slider 19 and tap 14. The magnitude of this electrical signal will be directly proportional to the saturated water vapor pressure at the particular dew point temperature that has been selected by the positioning of the slider 19.

In the other portion of the network 10, it will be seen that the potentiometer resistor 22 is directly connected to the secondary 13 between the tap 14 and the right hand terminal of the secondary. Connected between the slider 23 and the lower end of resistor 22 is the potentiometer resistor 25. This latter resistor 25 has a nonlinear characterization which is the same as that of resistor 18 and thus follows the saturation curve shown in Figure 3. The slider 26 on this potentiometer resistor 25 is positioned, through adjustment of knob 56 in accordance with dry bulb temperature so that the electrical resistance measured between the slider 26 and ground 60 will be a direct function of the saturated water vapor pressure at dry bulb temperature. When a particular relative humidity is to be determined, it is necessary to position the knobs 55 and 56 in accordance with dew point and dry bulb temperatures respectively. Under all conditions where the relative humidity is less than 100%, the setting of the dew point temperature will be lower than the setting of the dry bulb temperature. With the temperatures different, it will be obvious that the electrical signal on the slider 19 will be less than that on slider 26 if the same voltages are applied to the resistors 18 and 25. Thus, to make the electrical signals equal, it is necessary to decrease the voltage applied to the ends of potentiometer resistor 25. This is done by moving the slider 23 until the voltages are equal on the sliders 19 and 26. The movement of the slider 23 is accomplished by the motor 36 and the resultant position of the slider 23 on resistor 22 will be a direct function of relative humidity. The effect of decreasing the voltage applied to resistor 25 in accordance with the position of the slider 23 is to obtain an output signal on the slider 26 with respect to ground 60 which is an indication of the product of relative humidity in percent and dry bulb saturated water vapor pressure. When the position of the slider 23 indicates a relative humidity which corresponds to the position of the dry bulb and dew point temperature settings, the electrical signals on sliders 19 and 26 will be equal in magnitude. Thus, if the relative humidity indicator 59, and therefore slider 23, is correctly positioned for the corresponding dew point temperature setting and dry bulb temperature setting, the product of relative humidity and dry bulb saturated water vapor pressure will equal the saturated water vapor pressure at the dew point temperature.

Electrically this will mean, under balanced conditions, that the electrical signals between slider 26 and ground 60 will be equal in magnitude and opposite in phase to the electrical signal between slider 19 and ground 60. The reason the electrical signals will be opposite in phase is because the two portions are energized from opposite halves of the alternating current transformer secondary 13 with a common connection of the potentiometer resistors to the grounded center tap 14. When there is electrical balance, the electrical signal on the conductor 61, connected to the junction of equal resistors 27 and 28, with respect to ground will be zero. With no electrical signal on conductor 61 there will be no input signal on the input terminals 62 and 63 of amplifier 33. With no input signals on the input of amplifier 33, there will be no output tending to drive the motor 36 and the system will remain stationary in the balanced condition.

If a change in setting should be made in the dew point temperature knob 55, to indicate that the dew point temperature has dropped, the slider 19 will be moved in a downward direction. This will mean that the electrical signal between slider 19 and ground 60 will be less than before. Considering the phasing of transformer secondary 13 during one particular half cycle where the left hand terminal is negative and the right hand terminal positive, it will be seen that with a smaller negative signal appearing on terminal 19 and with the positive signal on slider 26 remaining the same there will be a signal on conductor 61 with respect to ground 60. The phasing of this signal will be such that it will be positive on conductor 61 when measured with respect to ground 60. With this signal on conductor 61 there will be a signal applied to the input of amplifier 33 between terminal 62 and 63 and the phasing will be such as to cause the amplifier to drive the motor 36 with a direction of rotation such that the slider 23 will be moved downwardly to reduce the voltage applied to potentiometer 25 and therefore the voltage appearing upon slider 26. As soon as the slider 23 has moved to a point where the magnitude of the signal on slider 26 equals that on slider 19, the system will be again balanced and the indicator 59 will indicate a new and lower value of relative humidity to correspond with the new relation set up between dew point temperature and dry bulb temperature.

It will be obvious that if any adjustment is made in the position of either knob 55 or of knob 56, there will be a resultant unbalance and a subsequent repositioning of the relative humidity indicator 59 and slider 23 by motor 36 to indicate the new relation, in terms of relative humidity, between the dew point temperature and the dry bulb temperature set into the computer circuit.

In order to prevent overshooting of the motor 36 as it is driving the slider 23 to a position of voltage balance, the velocity generator 43 is provided. The output of this generator is proportional to the speed at which it is driven and the phase of the output signal is arranged to be opposite to the phase of the signal on the amplifier input causing rotation of the motor 36. As the motor 36 drives the slider 23 toward the balance point of the computer circuit the output signal from the computer circuit 10 will be decreasing. When the signal from the computer circuit is combined with that of the velocity generator, the latter having a phase opposite that of the computer, the input signal to the amplifier will be wiped out prematurely and may even be reversed in phase if the motor is still traveling at a speed sufficient to cause the velocity generator output signal to exceed the unbalance signal from the computer circuit. The effect of this is to stop driving the motor and to apply a reverse driving torque thereto so that the motor inertia will not cause the slider 23 to be driven past the balance point. When the motor is stopped, there will be no output from the velocity generator to affect the operation of the apparatus.

It has been found that if the unbalance signal upon the conductor 61 is applied directly to the input of the amplifier 33 the overall apparatus tends to be sluggish in operation when the slider 26 is on the lower end or low impedance end of the potentiometer resistor 25. When the slider 26 is moved to the other extreme position or the high impedance end then the system tends to be oversensitive and the control motor 36 tends to hunt. This hunting tendency occurs because, with a larger proportion of the voltage applied to resistor 25 being fed the amplifier input, a given displacement of slider 23 will produce a larger unbalance input. To eliminate this tendency the potentiometer resistor 30 and slider 31 are used. The functioning of the potentiometer resistor 30 and slider 31 are to stabilize the operation of the system over all ranges of adjustment of the slider 26 along resistor 25. This potentiometer functions as a sensitivity or gain control potentiometer which is used to maintain the input signals in the amplifier 33 constant for a unit of displacement of slider 23 from the balance point on potentiometer resistor 22 regardless of the setting of the slider 26 on potentiometer resistor 25. In other words, when the slider 26 is in a position near the top of resistor 25, it is desired that the input signal to amplifier 33 for a given unit of displacement of slider 23 on potentiometer resistor 22 be the same as when slider 26 is at a position on the lower end of the resistor 25 and there is a corresponding unit of displacement of slider 23 on resistor 22.

In the electrical circuit the resistor 30 and slider 31 form a voltage divider on the input of the amplifier 33. All of the unbalance voltage of network 10 is applied across the potentiometer resistor 30 and resistor 32 in series. The slider 31 is then used to determine how much of the unbalance signal will be applied to the input of the amplifier 33. The slider 31 is moved at the same time that the slider 26 is adjusted by the dry bulb temperature selecting knob 56. In order that the sensitivity will be same for all positions of the slider 26 on potentiometer resistor 25, the characterization of the potentiometer resistor 30 together with series resistor 32, is chosen to be the inverse of that of resistor 25; and is so connected to the network that the slider 31 is at the end connected to lead 61 when slider 26 is at the end of resistor 25 connected to ground 60. Likewise, when the slider 26 is at the high impedance end of resistor 25, the slider 31 is at the end of the resistor 30 connected to resistor 32.

Obviously, there are many ways in which the sensitivity may be controlled. Thus, as in Figure 2, which is a modified portion of Figure 1, a different arrangement has been shown. In Figure 2 identical components carry the same reference numerals as in Figure 1. In this figure the sensitivity control is through potentiometer resistor 70 and slider 71, which are arranged for controlling the gain within the amplifier 33 by inclusion in a feedback loop covering a portion of the amplifier preceding the point at which the velocity generator signal is introduced. Control of amplifier gain by adjustment of feedback ratio is well known in the art. If the gain of an amplifier without feedback is high, the gain with feedback is inversely proportional to the feedback ratio. By using the same characterization for resistor 70 as is used for resistor 25, and using the slider 71 to adjust the feedback ratio, the slider 71 being coupled to slider 26 through mechanical connection 57, the sensitivity is made to remain constant. Alternatively, the slider 71 may be made to control gain through a D. C. biasing adjustment. In this case the gain viz. bias characteristic of the amplifier must be taken into account in the characterization of resistor 70 in order to achieve constant sensitivity. The schematic illustration of Figure 2 is intended to represent broadly any arrangement utilizing gain control within the amplifier as contrasted with gain control ahead of the amplifier as illustrated in Figure 1. In any case, the slider 71 is adjusted at the same time that the slider 26 is adjusted by the dry bulb temperature adjusting knob 56, and the overall operation of a system utilizing the principles shown in Figure 2 is the same as that of Figure 1. The advantage in the system of Figure 2 is that the input signal to the amplifier is not cut down by a voltage divider before it is applied to the amplifier so that a larger signal is available for controlling purposes within the amplifier. Furthermore, the impedance into which the summing point conductor 61 looks is higher allowing the use of lower power in the potentiometer resistors.

From the foregoing it will be seen that there has been provided a highly stable control system wherein a control signal remains constant for a given displacement of the control device unbalance regardless of the adjustment of the control system. Obvious modifications will be apparent to those skilled in the art and therefore I intend to be limited solely by the scope of the appended claims.

I claim as my invention:

1. Motor control apparatus, comprising, a center-tapped transformer winding, a first potentiometer having a tap and having end terminals connected to the center tap and to one end of said transformer winding, a second potentiometer having end terminals and a tap, means connecting said last named end terminals between one end and the tap of said first potentiometer, a third potentiometer having a tap and end terminals with the end terminals connected to the center tap and the other end of said transformer winding, amplifying means for comparing the electrical signals on the taps of said second and third potentiometers and connected thereto, a motor connected in controlled relation to said amplifying means, said motor variably adjusting the tap on said first potentiometer, a fourth potentiometer connected to said amplifier for varying the effective magnitude of the comparison signal from the taps of said second and third potentiometers, and means adjusting the taps of said second and fourth potentiometers simultaneously so that the ratio of movement of the tap on said second potentiometer to the magnitude of the control signal applied to said motor will remain effectively constant for a given displacement of the tap on said first potentiometer throughout the range of adjustment of the tap of said first and second potentiometers.

2. Motor control apparatus comprising, a tapped transformer, a first potentiometer having end terminals and a tap with the end terminals connected to one end and the tap of said transformer, said first potentiometer having an effectively linear characterization, a second potentiometer having end terminals and a tap, said second potentiometer having a nonlinear characterization, means connecting said last named end terminals between one end and the tap of said first potentiometer, a third potentiometer having a tap and end terminals with the end terminals connected to the tap and the other end of said transformer, amplifying means connected to the taps of said second and third potentiometers for comparing the electrical signals thereon, a motor connected in controlled relation to said amplifying means, said motor variably adjusting the tap of said first potentiometer, a fourth potentiometer having a tap connected to said amplifier to vary the effective magnitude of the comparison signal applied to said motor, said fourth potentiometer having a nonlinear characterization which corresponds to that of said second potentiometer, and means adjusting the taps of said fourth and second potentiometers simultaneously to maintain the ratio of the movement of the tap on said second potentiometer to the magnitude of the control signal resulting from a unit of displacement of the tap of said first potentiometer applied to said motor effectively constant throughout the range of adjustment of the tap of said first and second potentiometers.

3. In a motor control apparatus, a balanceable electrical network having a plurality of adjustable impedances therein, means connecting two of said impedances for obtaining a mathematical product in terms of an electrical signal, said impedances when adjusted having a ratio of signal output to unit of adjustment of one of said impedances which varies as the other of said impedances is adjusted, a third of said plurality of impedances having an output signal, amplifying means connected to said network for comparing said electrical signal with the output signal of said third impedance, a motor connected to and controlled by the output of said amplifying means, a variable impedance connected to said amplifying means for varying the signal amplified by said amplifying means, and means for varying the impedance of said last named impedance when the impedance of one of said two impedances is adjusted so that the output signal from said amplifying means which is applied to said motor varies to maintain the variation in said ratio ineffective.

4. In a motor control apparatus, a balanceable electrical network having a plurality of adjustable impedances therein, means connecting two of said impedances for obtaining a mathematical product in terms of an electrical signal, said network when adjusted having a ratio of signal output to unit of adjustment of one of said impedances which varies as the other of said impedances is adjusted, a third of said plurality of impedances having an output signal, amplifying means connected to said network for comparing said electrical signal and said output signal, a motor connected to and controlled by the output of said amplifying means, a variable impedance connected to said amplifying means for varying the signal amplified by said amplifying means, and means for varying the impedance of said last named impedance when the impedance of said one of the two impedances is adjusted so that the output signal from said amplifying means which is applied to said motor varies to maintain the variation in said ratio ineffective, said last named and said one of the two impedances having impedance characteristics which are varied inversely as adjustment is made thereof.

5. In apparatus for determining relative humidity from a dry bulb temperature and a dew point temperature, first and second adjustable impedances having characterizations which vary in accordance with an atmospheric saturation curve, a third adjustable impedance which has a linear characterization, means adjusting said first impedance in accordance with changes in dew point temperature, means adjusting said second impedance in accordance with changes in dry bulb temperature, motor means adjusting said third impedance by an amount proportional to the relative humidity, circuit means interconnecting said impedances so that when the electrical signals from said second and third impedances are combined and equal the magnitude of the electrical signal from said first impedance, the impedance of said third impedance will represent relative humidity, amplifying means connected to said impedances for comparing the electrical signals therefrom, means connecting said amplifying means to said motor means to produce a repositioning effect when said compared signals are not equal, and means connected to said amplifying means positioned when said second impedance is varied for maintaining the ratio between the adjustment of said third impedance and the motor repositioning effect constant over all ranges of adjustment of said impedances.

6. In apparatus for determining relative humidity from a dry bulb temperature and a dew point temperature, first and second adjustable impedances having characterizations which vary in accordance with an atmospheric saturation curve, a third adjustable impedance which has a linear characterization, means adjusting said first impedance in accordance with changes in dew point temperature, means adjusting said second impedance in accordance with changes in dry bulb temperature, motor means adjusting said third impedance by an amount proportional to the relative humidity, circuit means interconnecting said impedances so that when the electrical signals from said second and third impedances are combined and equal the magnitude of the electrical signal from said first impedance, the impedance of said third impedance will represent relative humidity, amplifying means connected to said impedances for comparing the electrical signals thereon, means connecting said amplifying means to said motor means to position the same when said compared signals are not equal, means including a fourth impedance having a characterization which corresponds to that of said first and second impedances connected to said amplifier for varying the magnitude of the effective control signal applied to said motor by said amplifier, and means adjusting said fourth impedance simultaneously with the adjustment of said second impedance so that the ratio of the control signal applied to said amplifier to change in the adjustment of said second impedance remains constant.

7. Apparatus for computing in terms of electrical signals a mathematical equation, comprising, a source of power, a computing circuit including a plurality of interconnected variable impedances connected between said source of power and the output of said computing circuit, each of said impedances being varied in accordance with predetermined functions, and means for maintaining the sensitivity of said apparatus substantially constant throughout its range of operation, said means comprising a further electrical circuit connected to said output, said further electrical circuit being adjusted simultaneously with adjustment of said computing circuit.

8. Apparatus for computing in terms of electrical signals a mathematical equation, comprising, in a computing circuit, a source of power, a plurality of interconnected variable impedances one or more of which have nonlinear characterizations connected between said source of power and the output of said computing circuit, each of said impedances being varied in accordance with predetermined functions, and means for maintaining the sensitivity of said apparatus substantially constant throughout its range of operation, said means comprising a further variable impedance connected to said output, said further variable impedance having a characterization corresponding to that of one of said non-linearly characterized impedances and having its impedance varied simultaneously with variations of said one impedance.

9. Control apparatus comprising, a balanceable electrical network having a first and a second potentiometer therein, means adjusting said first and second potentiometers in accordance with separate functions of variable conditions, means interconnecting said first and second potentiometers so that the combined electrical signal from said potentiometers is indicative of the product of said functions, a third potentiometer connected in said balanceable network to provide an output signal in accordance with the position of the tap of said third potentiometer, means connecting the potentiometers in controlling relation to a positioning means to apply to said positioning means a signal voltage which is indicative of the relative magnitudes of said combined electrical signal and said output signal, said last named means including a further potentiometer whose adjustment varies the signal voltage applied to said positioning means, and means adjusting said last named potentiometer when one of said first named potentiometers is adjusted to maintain the ratio of electrical signal to potentiometer movement effectively constant regardless of the adjustment of said first named potentiometers.

10. An electrical network circuit comprising, a source of power, a first and a second potentiometer, circuit means connecting said first potentiometer to said source of power, means connecting a second potentiometer to the output of said first potentiometer, means adjusting said potentiometers in accordance with variable functions, said potentiometers having a combined electrical signal which is a function of the products of said variable functions, a third potentiometer connected to said source of power to provide an output signal in accordance with the position of the tap of said third potentiometer, means to be controlled by said combined electrical signal and said output signal, a fourth potentiometer, means including said fourth potentiometer for connecting said combined electrical signal and said output signal in controlling relation to said means to be controlled, and means mechanically connecting said fourth potentiometer to one of said first named potentiometers to variably select the magnitude of said combined electrical signal to maintain the ratio of signal output to potentiometer adjustment effectively constant over all ranges of adjustment of said first and second potentiometers.

11. Motor control apparatus comprising, a source of power, a first potentiometer having end terminals and a tap, a second potentiometer having end terminals and a tap, means connecting the end terminals of said second potentiometer to one end terminal and to the tap of said first potentiometer, a third potentiometer having end terminals and a tap, means connecting the end terminals of said first and third potentiometers in a series circuit to said source of power, the connection of said first potentiometer to said third potentiometer in said series circuit forming a voltage reference junction, amplifying means for comparing the electrical signal voltages on the taps of said second and third potentiometers with respect to the voltage of said reference junction, circuit means connecting said amplifying means to the taps of said second and third potentiometers, a motor connected in controlled relation to said amplifying means, said motor variably adjusting the tap of said first potentiometer, a fourth potentiometer connected to said amplifying means for varying the effective magnitude of the comparison signal from the taps of said second and third potentiometers, and means adjusting the taps of said second and fourth potentiometers simultaneously so that the ratio of movement of the tap on said second potentiometer to the magnitude of the control signal applied to said motor will remain effectively constant for a given displacement of the tap on said first potentiometer throughout the range of adjustment of the taps of said first and second potentiometers.

12. Motor control apparatus comprising, a source of power; a first potentiometer having end terminals and a tap; a second potentiometer having end terminals and a tap; means connecting the end terminals of said second potentiometer to one end terminal and to the tap of said first potentiometer; a third potentiometer having end terminals and a tap; means connecting end terminals of said first and third potentiometer to said source of power, said last named means being effective to place a voltage of one polarity, with respect to said one end terminal of said first potentiometer, on the other end terminal of said first potentiometer and to place a voltage of the opposite polarity on an end terminal of said third potentiometer; amplifying means for comparing the electrical signal voltages on the taps of said second and third potentiometers with respect to the voltage of said one end terminal of said first potentiometer, circuit means connecting said amplifying means to the taps of said second and third potentiometers, a motor connected in controlled relation to said amplifying means, said motor variable adjusting the tap of said first potentiometer, a fourth potentiometer connected to said amplifier for varying the effective magnitude of the comparison signal from the taps of said second and third potentiometers, and means adjusting the taps of said second and fourth potentiometers simultaneously so that the ratio of movement of the tap on said second potentiometer to the magnitude of the control signal applied to said motor will remain effectively constant for a given displacement of the tap on said first potentiometer throughout the range of adjustment of the taps of said first and second potentiometers.

13. A control apparatus comprising, a first source of variable voltage, a second source of variable voltage, adjustable voltage dividing means having an output circuit and connected to said second source of voltage to apply a portion of the output voltage of said second source at said output circuit; amplifying means, summing circuit means connecting said first source of variable voltage and the output circuit of said voltage dividing means to said amplifying means, said amplifying means thereby being subjected to a control voltage indicative of the relative magnitudes of the output voltage of said first source and said portion of the output voltage of said second source, and means comprising a variable impedance connected to said amplifying means and varied jointly with said voltage dividing means to maintain the sensitivity of the apparatus to variation in the output of said second source constant independent of the setting of said voltage dividing means.

14. A control apparatus comprising, a first source of voltage whose output is varied in accordance with a first condition, a second source of variable voltage, variable voltage dividing means having an output circuit and connected to said second source of voltage to apply a portion of the output voltage of said second source to said output circuit, said voltage dividing means arranged to be varied in accordance with a second condition; amplifying means, summing circuit means connecting said first source of voltage and the output circuit of said voltage dividing means to said amplifying means, power means controlled by said amplifying means and connected to vary the output of said second source of voltage in accordance with a mathematical equation relating said first condition to said second condition; and means comprising a variable impedance connected to said amplifying means and varied jointly with said voltage dividing means to maintain the sensitivity of the apparatus to variation in the output of said second source constant independent of the setting of said voltage dividing means.

References Cited in the file of this patent

UNITED STATES PATENTS

| Number | Name | Date |
| --- | --- | --- |
| 1,506,936 | Lea | Sept. 2, 1924 |
| 2,397,477 | Kellogg | Apr. 2, 1946 |
| 2,433,771 | Lindenberg, Jr. et al. | Dec. 30, 1947 |
| 2,488,448 | Townes et al. | Nov. 15, 1949 |
| 2,515,888 | Murray | July 18, 1950 |
| 2,547,105 | Williams, Jr. | Apr. 3, 1951 |
| 2,574,656 | Peterson | Nov. 13, 1951 |
| 2,617,586 | Gray | Nov. 11, 1952 |

OTHER REFERENCES

"Electronic Computers," Shannon, Electronics, August 1946, pp. 110–113.